United States Patent [19]

Takada et al.

[11] Patent Number: 5,363,741
[45] Date of Patent: Nov. 15, 1994

[54] SLIDE ACTUATOR

[75] Inventors: Susumu Takada; Masayuki Hosono; Kouichirou Ishibashi; Koichiro Kanda, all of Ibaraki, Japan

[73] Assignee: SMC Kabushiki Kaisha, Tokyo, Japan

[21] Appl. No.: 77,608

[22] Filed: Jun. 17, 1993

[30] Foreign Application Priority Data

Dec. 24, 1992 [JP] Japan ................................. 4-088434

[51] Int. Cl.⁵ ............................................. F01B 31/14
[52] U.S. Cl. ..................................... 92/13.5; 92/146; 92/161; 92/165 R; 92/165 PR; 384/47
[58] Field of Search .................... 92/146, 161, 165 R, 92/165 PR, 13.5, 13.7; 384/47

[56] References Cited

U.S. PATENT DOCUMENTS

| | | | |
|---|---|---|---|
| 1,687,369 | 10/1920 | La Pointe | 92/146 |
| 3,778,121 | 12/1973 | Levesque | 384/47 |
| 3,960,413 | 6/1976 | Abbuhl et al. | 384/47 |
| 4,726,283 | 2/1988 | Miyamoto | 92/146 |
| 4,746,228 | 5/1988 | Shimo | 384/47 |
| 4,796,516 | 1/1989 | Horváth | 92/165 R |
| 4,829,880 | 5/1989 | Lieberman | 92/165 PR |

FOREIGN PATENT DOCUMENTS

0134398  3/1985  European Pat. Off. .
197901   1/1979  United Kingdom ............... 92/146

Primary Examiner—Thomas E. Denion
Attorney, Agent, or Firm—Oblon, Spivak, McClelland, Maier & Neustadt

[57] ABSTRACT

In a slide actuator, a central guide rail having V-shaped grooves defined therein and opened at 90 degree angles, is mounted on a cylinder body. A slide table is brought into engagement with the guide rail. Guide members having V-shaped grooves defined therein are provided inside the slide table so that they are opposed to the grooves defined in the guide rail. Cylindrical roller bearings are alternately fitted at inclinations of 90° in their corresponding channels defined by the opposed grooves. Thus, when the roller bearings are rolled, the slide table is displaced with higher accuracy and a load supported by the slide table is transmitted to the guide rail from the roller bearings.

32 Claims, 10 Drawing Sheets

SLIDE ACTUATOR

BACKGROUND OF THE INVENTION

1. Field of the Invention

This invention relates to a slide actuator, and more specifically to a slide actuator wherein roller bearings are disposed within channels defined between a cylinder body and a slide table so as to enhance the load-resistance characteristic of the moving slide table.

2. Description of the Related Art

When a work item is displaced with high accuracy under the action of a conventional fluid pressure cylinder, there is used a structure wherein guide rods are respectively mounted to piston rods and the plate to be driven is held in engagement with the leading ends of both the piston rods and the guide rods. When the plate is displaced under the actuation of the cylinder, the plate is guided by the guide rods, and the guide rods advantageously share or support a portion of a load, thus enabling the conveyance of the work item or the like with relatively satisfactory accuracy.

In such a cylinder, the guide rods are in the form of a column or a cylinder. The accuracy of guiding the plate by the guide rods is obtained by supporting the guide rods with ball bushings within a cylinder body. Thus, circumferential side surfaces of the guide rods are held in point-to-point contact with spherical surfaces of the ball bushings. When the load acts on the guide rods from the plate in this condition, the load, i.e., the pressure applied to both the circumferential side surfaces of the guide rods and the spherical surfaces of the ball bushings, is maintained at an allowable pressure or lower. Therefore, the pressure applied to the guide rods can be reduced by increasing the curvature of each guide rod and the areas at which the guide rods make contact with ball bearings fitted on the ball bushings. However, the cross-section of each guide rod (and hence its size and weight) will increase as the curvature is increased. Thus, the prior art cannot reduce the actuator in size and weight.

SUMMARY OF THE INVENTION

The object of the present invention is to provide a slide actuator wherein a work item can be accurately transferred by enhancing the resistance to load and a further reduction in size and weight can be achieved.

According to one aspect of the present invention, there is provided a slide actuator comprising a cylinder body having first and second chambers and first and second ports for communication between said first and second chambers and an external pressurized fluid source; first and second pistons reciprocably and respectively displaceable within said first and second chambers, in response to the pressurized fluid; first and second piston rods attached at respective ends to said first and second pistons, and having respective other ends projecting from said cylinder body; a guide rail mounted centrally on top of said cylinder body; a slide table slidable along said cylinder body and guided by said guide rail, said slide table having one end fixed to said projecting ends of said first and second piston rods, and having mounted underneath, two guide members which bracket said central guide rail in an approximate mating configuration; said central guide rail having two 90° V-shaped grooves on opposed sides thereof, and said guide members having 90° V-shaped grooves opening in an opposed fashion to respective guide rail V-shaped grooves, to thereby define two channels; and a plurality of cylindrical rollers, alternately inclined by 90°, and fitted in said channels.

According to the present invention constructed as described, fluid pressure displaces the pistons, which in turn displaces the slide table and guide members. When a load is applied to the slide table, the load is supported by the cylindrical roller bearings fitted within the two channels defined by the first and second grooves in each of the guide members and guide rail. The circumferential surfaces of the roller bearings are respectively brought into contact with the planes of the two channels. As a result, the areas at which the circumferential surfaces make contact with the above planes increase, thus enabling the roller bearings to share and support a large load.

The above and other objects, features and advantages of the present invention will become apparent from the following description and the appended claims, taken in conjunction with the accompanying drawings in which preferred embodiments of the present invention are shown by way of illustrative example.

DESCRIPTION OF THE PREFERRED EMBODIMENTS

Figure 1:
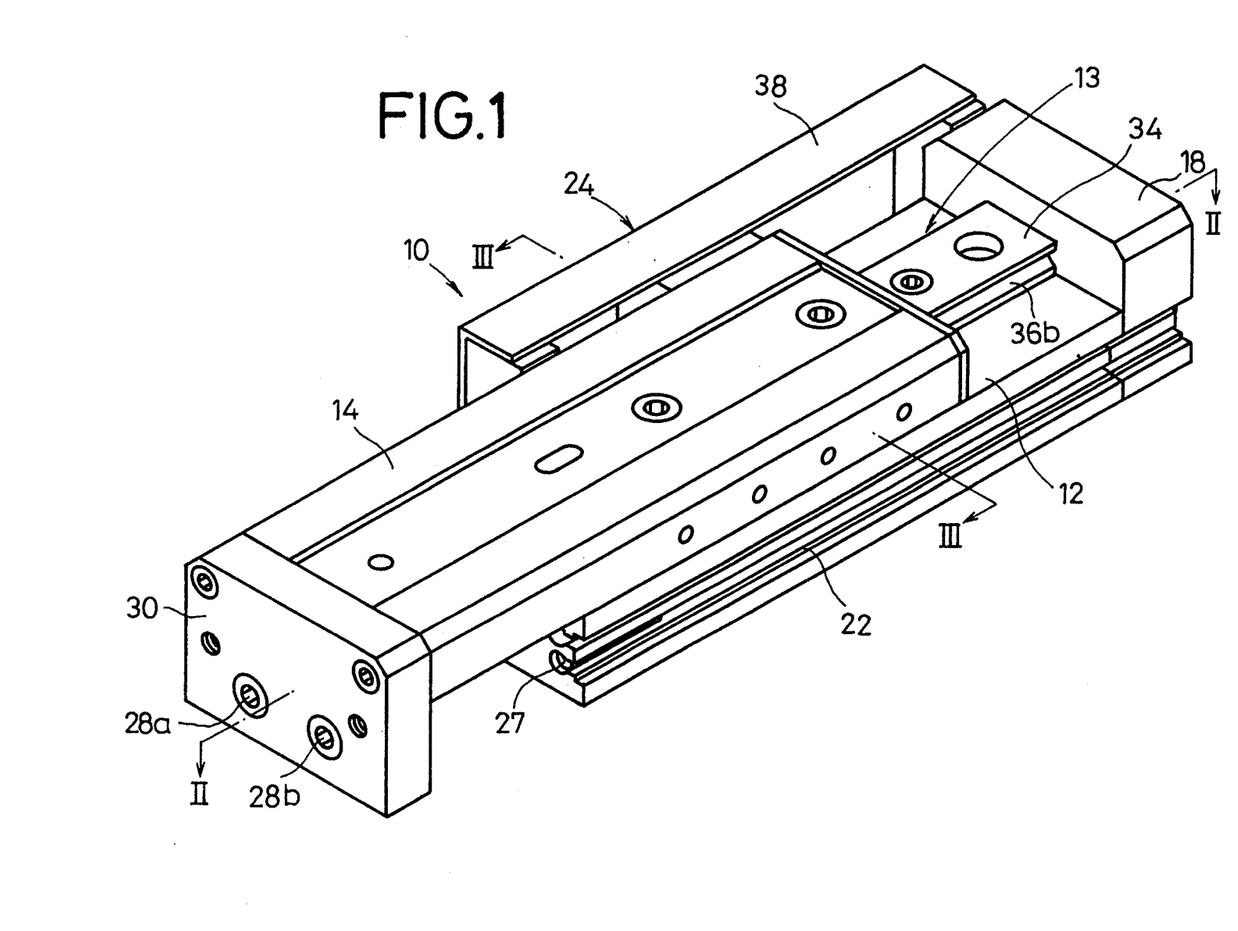
FIG. 1 is a perspective view of a slide actuator according to one embodiment of the present invention.

As shown in FIG. 1, a slide actuator 10 comprises a cylinder body 12 having a fluid pressure cylinder formed therein, and a slide table 14 reciprocably slidable along an upper portion of the cylinder body 12 under the guidance of a guide mechanism 13.

Figure 2:
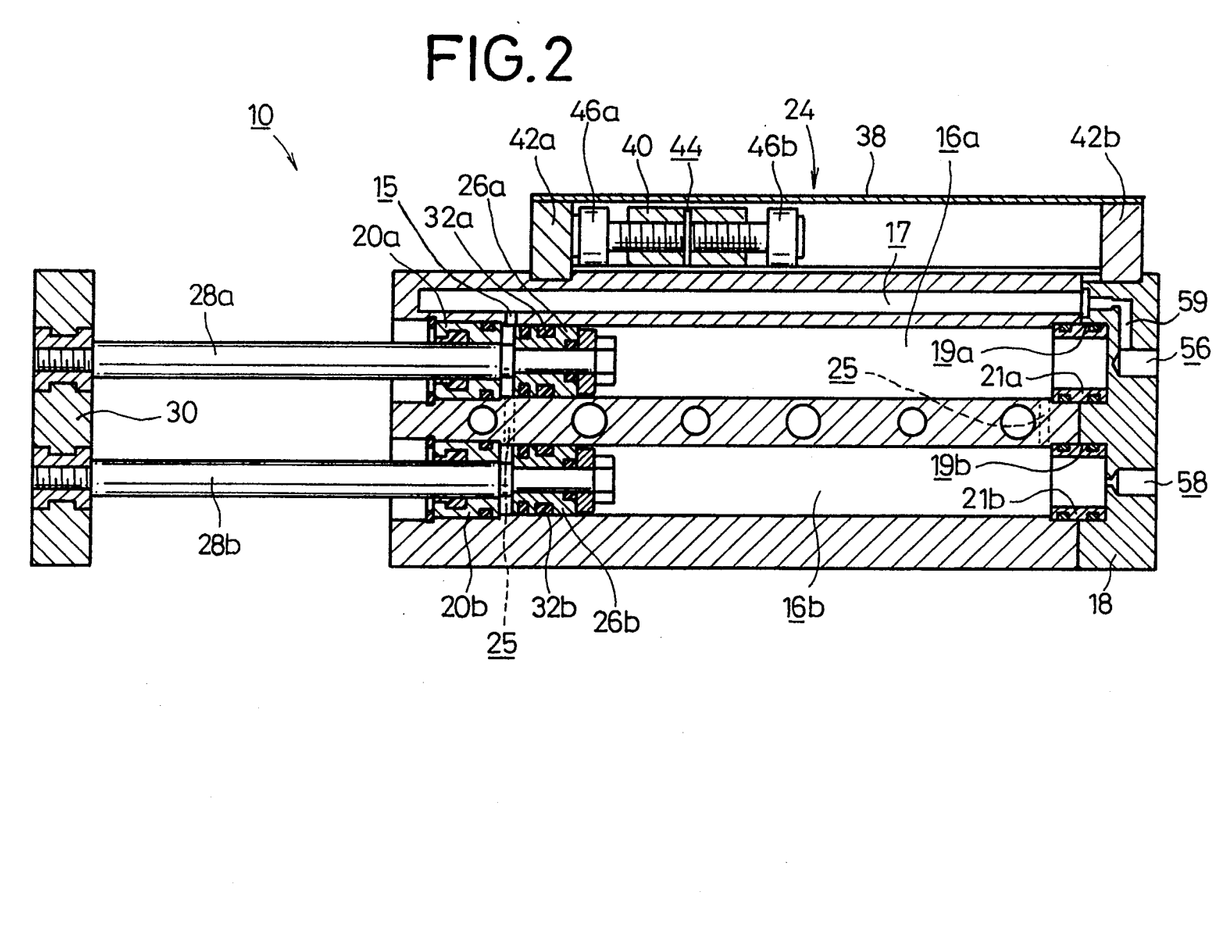
FIG. 2 is a transverse sectional view of the slide actuator shown in FIG. 1, taken along line II—II of FIG. 1.

As shown in FIG. 2, the cylinder body 12 has two cylinder chambers 16a and 16b extending in parallel along its longitudinal direction, and a fluid passage 17 defined therein along its longitudinal direction. The passage 17 communicates with the cylinder chamber 16a through a passage 15. Chamber 16a and chamber 16b communicate by passages 25. Further, the cylinder chambers 16a and 16b are closed or blocked by a head cover 18 at one end, and by respective rod covers 20a and 20b at the other end. The head cover 18 has circular concave portions 19a and 19b positioned to align with corresponding ends of cylinder chambers 16a and 16b respectively. Further, the head cover 18 is positioned by fitting bushings 21a and 21b respectively between the cylinder chamber 16a and the concave portion 19a and between the cylinder chamber 16b and the concave portion 19b.

Figure 3:
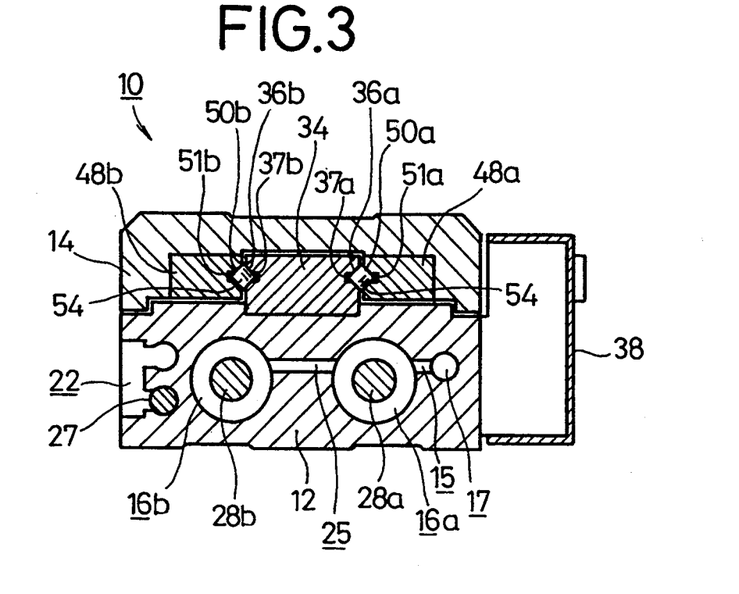
FIG. 3 is a partially-cut sectional view of the slide actuator shown in FIG. 1, taken along line III—III of FIG. 1.

As illustrated in FIGS. 1 and 3, a magnetic detecting switch 27 is provided in a switch mounting groove 22 defined along one longitudinal side of the cylinder body 12, for detecting the position of pistons 26a and 26b. Further, a stroke control mechanism 24 (to be described later) is mounted to the other side of the cylinder body 12.

As seen in FIG. 2, pistons 26a and 26b are respectively accommodated in the cylinder chambers 16a and 16b. Respective one ends of rods 28a and 28b are rigidly fixed to pistons 26a and 26b, and respective other ends extend outwardly, through rod covers 20a and 20b, and are rigidly fixed to end plate 30. End plate 30 is integrally formed with or rigidly fixed to one end of slide table 14, as best seen in FIG. 1.

Magnets 32a and 32b are mounted in the pistons 26a and 26b respectively. The position of the pistons 26a and 26b is detected by a magnetic detecting switch 27 mounted in the switch mounting groove 22, as seen in FIGS. 1 and 3. Accordingly, the cylinder body 12 is made of a non-magnetic material such as aluminum or the like.

As shown in FIGS. 1 and 3, a central guide rail 34 of the guide mechanism 13, is mounted on the upper surface of the cylinder body 12. 90° V-shaped grooves 36a and 36b are defined on opposed sides of the guide rail 34. Stoppers 37 are respectively mounted at one end of grooves 36a and 36b to prevent roller bearings 54 (described later) from exiting from the grooves 36a and 36b (see FIG. 4).

As shown in FIG. 2, the stroke control mechanism 24 is accommodated within the cover 38 mounted to the cylinder body 12 and has stopper blocks 42a and 42b bracketing a shuttle block 40 which is fixed to a side of slide table 14. The stopper blocks 42a and 42b are respectively secured to predetermined positions of the cylinder body 12. The shuttle block 40 has adjustable, threaded screws 46a and 46b provided at opposed ends thereof orientated along the direction of displacement of slide table 14, and a slit 44 defined centrally and transversely therein. When the heads of the screws 46a and 46b abut against the stopper blocks 42a and 42b respectively, movement of the slide table 14 is stopped. Thus, the overall length (or equivalently, the travelling distance) of the two screws 46a and 46b is adjusted by turning the screws 46a and 46b. It is therefore possible to finely adjust the strokes of the pistons 26a and 26b.

Figure 4:
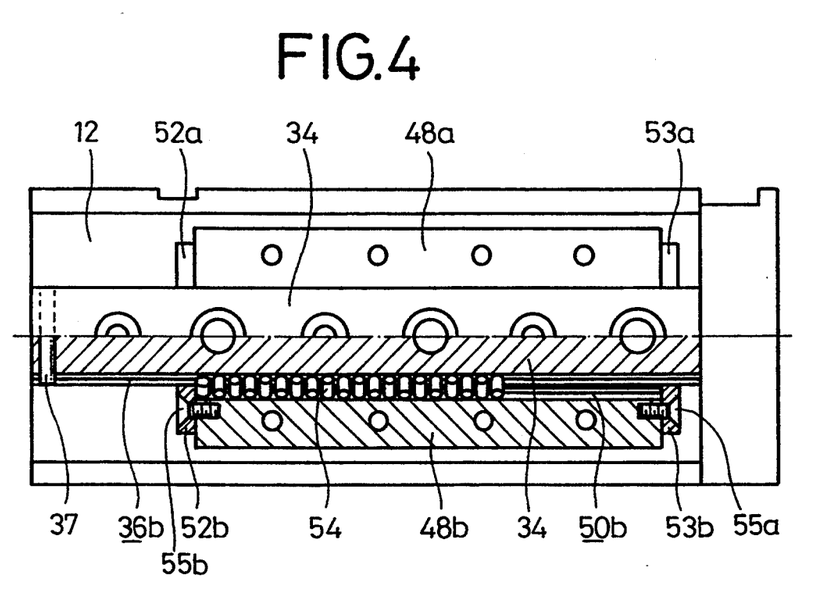
FIG. 4 is a top, partially sectional fragmentary illustration of a guide mechanism employed in the slide actuator shown in FIG. 1.
Figure 5:
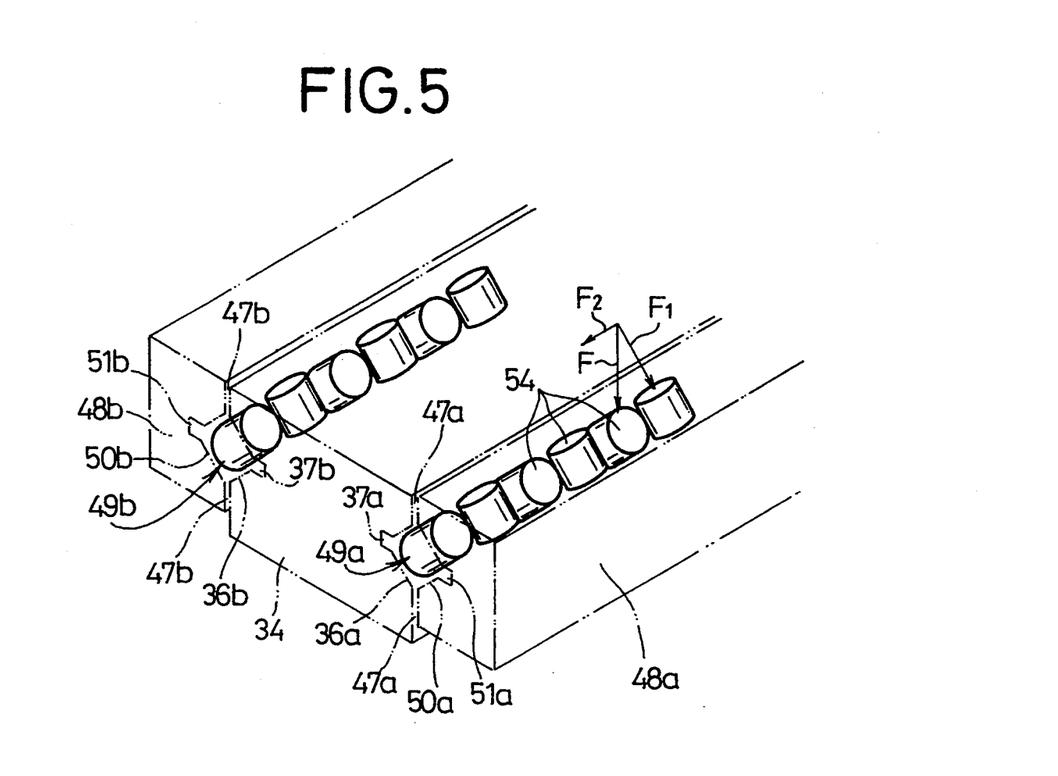
FIG. 5 is a fragmentary perspective view of the arrangement of cylindrical roller bearings of the guide mechanism employed in the slide actuator shown in FIG. 1.

As illustrated in FIGS. 3 and 5, guide members 48a and 48b are mounted to the underside of table 14 within the concave portion defined therein. The guide members 48a and 48b respectively have 90° V-shaped grooves 50a and 50b defined therein in an opposing relationship to respective grooves 36a and 36b of the guide rail 34, so as to form two longitudinal channels 49a and 49b. Channels 49a and 49b are approximately square in cross-section to accommodate roller bearings 54. As shown in FIG. 4, stoppers 52a, 52b, 53a and 53b are threadedly mounted by screws 55a and 55b at their corresponding ends of the grooves 50a and 50b of the guide members 48a and 48b. As is understood from FIG. 4, the roller bearings 54 are not provided over the entire length of the channels 49a and 49b. The number of roller bearings is selected so that the roller bearings 54 freely roll within the channels 49a and 49b (i.e. with separations between individual roller bearings 54), and are preferably even an number in each of channels 49a and 49b.

As best seen in FIG. 5, the roller bearings 54 are fitted within the channels 49a and 49b in alternating 45° angles from the vertical, i.e. alternating 90° by 90° to one another. Gaps and slots are provided to facilitate the rolling of the roller bearings 54 within such channels 49a and 49b, as follows. The horizontal gap extending vertically between opposed sides of guide rail 34 and associated respective portions of guide members 48a and 48b, provide a clearance for one set of opposed peripheral edges to free roll within. Longitudinally extending slots 37a, 37b, 51a and 51b are respectively provided at the opposed apexes of the grooves 36a, 36b, 50a and 50b. The other set of opposed peripheral edges of the inclined roller bearings 54 move freely within the clearances provided by slots 37a, 51a and 37b, 51b.

To summarize, the guide mechanism 13 includes the guide rail 34 with grooves 36a and 36b, interacting with guide members 48a and 48b with grooves 50a and 50b, thereby defining channels 49a and 49b in which a plurality of cylindrical roller bearings 54 freely roll in alternating orientation.

In FIG. 2, ports 56 and 58 are defined in the head cover 18 for coupling to a compressed-air supply source through an unillustrated directional control valve. As seen in FIGS. 2 and 3, the port 56 communicates with cylinder chamber 16a through a narrow passage 59 defined in the head cover 18, the fluid passage 17 and then passage 15. Chamber 16a and chamber 16b communicate by passages 25. The port 58 communicates directly with the cylinder chamber 16b through bushing 21b.

The slide actuator 10 constructed as described above, is actuated in the following manner.

Fluid pressure is supplied from the unillustrated compressed-air supply source to the cylinder chambers 16a and 16b, alternating through ports 56 and 58, to reciprocate the pistons 26a and 26b. Correspondingly, the rods 28a and 28b, the end plate 30 and the slide table 14 are also reciprocated following the reciprocating pistons 26a and 26b. At this time, the screws 46a and 46b of the stroke control mechanism 24 are respectively brought into abutment against the stopper blocks 42a and 42b, thereby making it possible to control the amount of displacement of the pistons 26a and 26b. Guide members 48a and 48b and the slide table 14 can be smoothly displaced because the roller bearings 54 of the guide mechanism 13 are smoothly rolled.

As shown in FIG. 5, the roller bearings 54 divide each of loads F acting thereon from the slide table 14 (not illustrated for simplification) through the guide members 48a and 48b, into $F_1$ and $F_2$. Accordingly, the area at which each of the roller bearings 54 contacts the grooves 50a and 50b, is large compared with only the point-to-point contacts between a conventional slide actuator sliding on spherical bearings. Therefore, the acting loads can be dispersed and supported on roller bearings 54 of relatively small size.

Slots 51a, 51b, 37a and 37b extending along the apexes of grooves 50a, 50b, 36a and 36b, facilitate the free rolling of the roller bearings 54 by providing a clearance for the edges of the roller bearings 54 closest to respective apexes of the grooves 50a, 50b, 36a and 36b.

The above-described slide actuator 10 according to the present embodiment has the following advantages. Since the load is supported by the circumferential surfaces of the roller bearings 54 acting on the planar surfaces of the grooves 50a, 50b, 36a and 36b, the pressure-receiving areas are increased. Accordingly, the slide actuator 10 can be reduced in size. Further, since the roller bearings 54 are orientated alternately, inclined 90° by 90°, and if there is an equal and even number of roller bearings 54 alternated in each channel 49a and 49b, then the total surface of contact in the $F_1$ and $F_2$ directions, is equal. As a result, the roller bearings 54 can effectively share and support the load irrespective of the direction in which the load is applied.

Further, since the stroke control mechanism 24 is mounted to the side of the cylinder body 12, the slide table 14 can be positioned with high accuracy.

Moreover, since the end plate 30 and the slide table 14 are integrally fixed or formed, and the cross section of the slide table 14 is shaped in the form of an inverted U-shaped recess so as to increase its rigidity, the rods 28a and 28b are not bent by the load of a work item which is mounted to the end plate 30.

A slide actuator 60 according to a second embodiment will next be described below with reference to FIGS. 6 and 7. Elements of the structure in the slide actuator 60, which are substantially identical to those employed in the slide actuator 10 according to the first embodiment, are identified by like reference numerals and their detailed description will therefore be omitted. Subsequent embodiments will also be treated in the same manner as described above.

Figure 6:
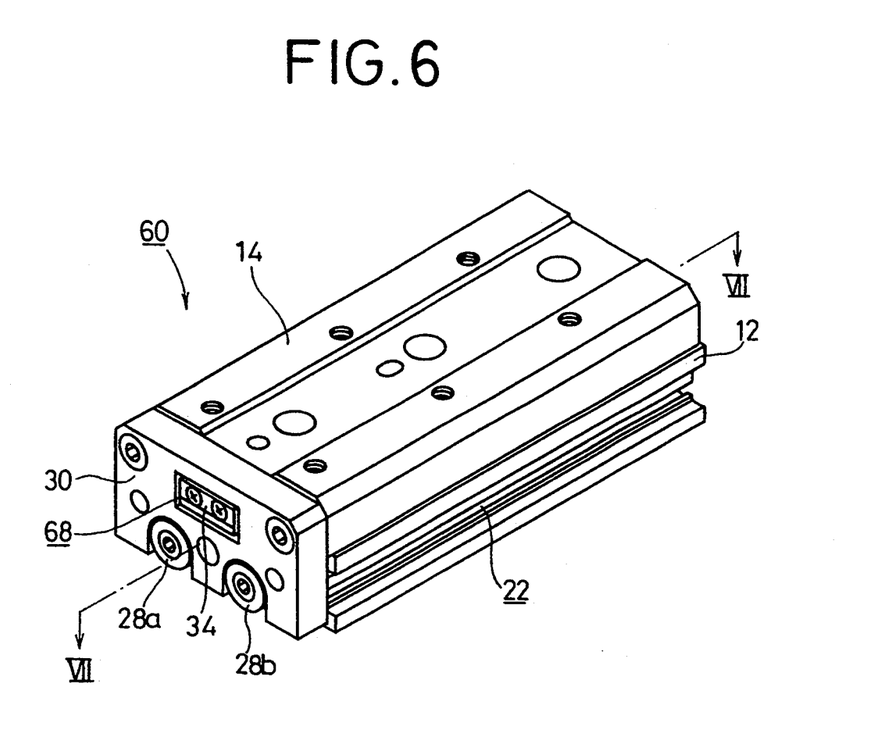
FIG. 6 is a perspective view of a slide actuator according to another embodiment of the present invention.
Figure 7:
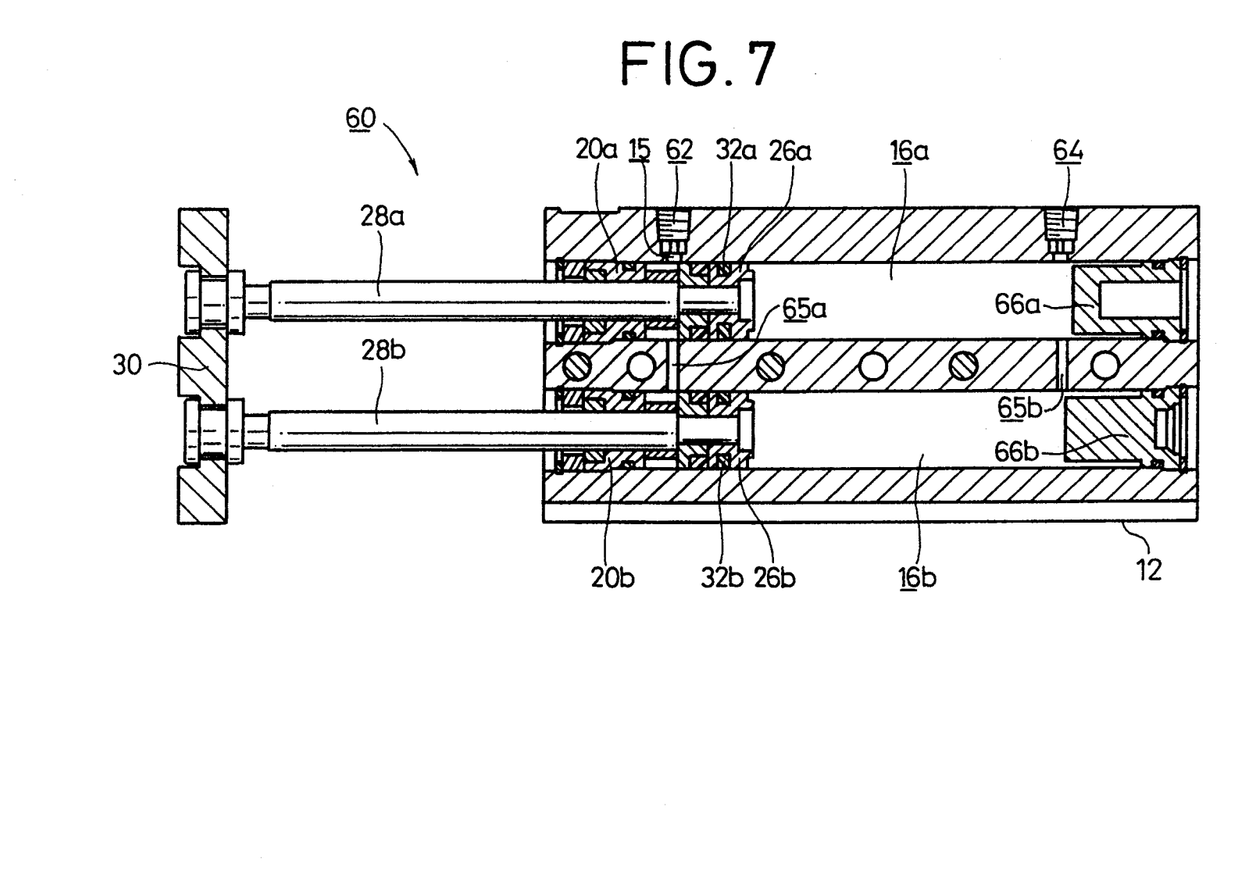
FIG. 7 is a transverse sectional view taken along line VII—VII of FIG. 6.

As shown in FIGS. 6 and 7, ports 62 and 64, corresponding to the ports 56 and 58 employed in the first embodiment, are defined in one side of a cylinder body 12, and communicate with chamber 16a, and also with cylinder chamber 16b through passages 65a and 65b. Further, respective ends of cylinder chambers 16a and 16b are closed or blocked by stoppers 66a and 66b respectively. Therefore, the slide actuator 60 does not need the head cover 18 having the ports 56 and 58 defined therein, as in the first embodiment. Also, end plate 30 has an hole 68 therethrough profiled to accept the leading end portion of guide rail 34 (as seen in FIG. 6) at one end of the piston stroke. These structural features result in a reduction of the length of actuator 60.

Figure 8:
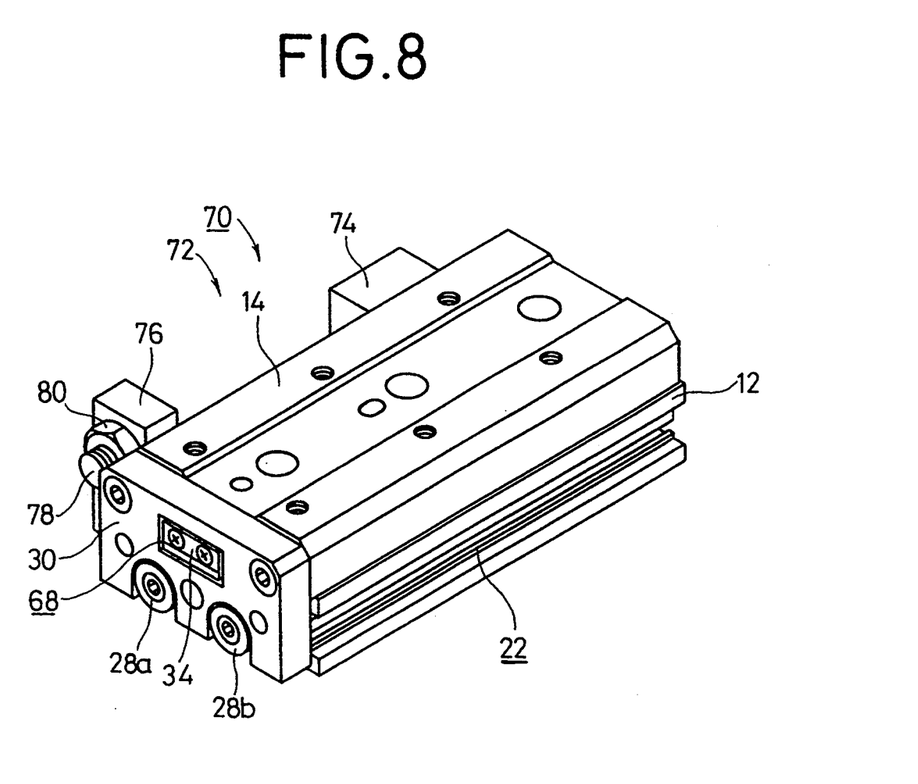
FIG. 8 is a perspective view of a slide actuator according to a further embodiment of the present invention.

With reference to FIG. 8, a description will be made of a slide actuator 70 according to a third embodiment. The slide actuator 70 is constructed by mounting a stroke control mechanism 72 (having a function substantially identical to that of the stroke control mechanism 24 employed in the first embodiment) to the slide actuator 60 employed in the second embodiment.

The stroke control mechanism 72 comprises a stopper block 76 attached to the side of a cylinder body 12 at one end thereof, a shuttle block 74 mounted to a side of the slide table 14 at the far end thereof, and a screw 78 and nut combination 80 threadedly inserted into stopper block 76. The slide table 14 is stopped when the shuttle block 74 abuts against the leading end of the screw 78 (not shown). The stroke of the slide table 14 can be finely adjusted by rotating the screw 78.

Figure 9:
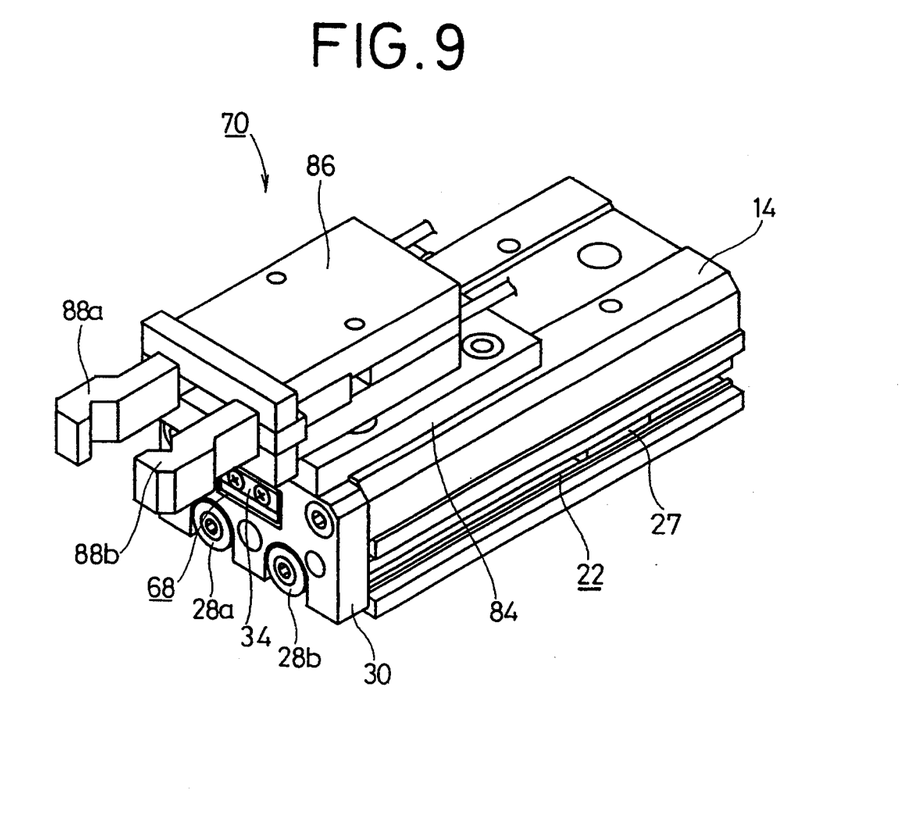
FIG. 9 is a perspective view showing the mounting of a connecting plate and an air chuck on the slide actuator shown in FIG. 8.

In a variation of the third embodiment, a connecting plate 84 is mounted on the slide table 14 and an air chuck 86 is mounted on the connecting plate 84, as shown in FIG. 9. The air chuck 86 opens and closes grippers 88a and 88b in parallel under the action of air pressure or the like to grip a work or the like. Thus, compressed air is introduced into cylinder chambers 16a and 16b through one port 64, for example so as to move forward or advance pistons 26a and 26b, and thereby the slide table 14. When rods 28a and 28b reach the forward end, the work is gripped by the grippers 88a and 88b of the air chuck 86. Compressed air is then introduced into the cylinder chambers 16a and 16b through the other port 62. Accordingly, the pistons 26a and 26b, and thus the slide table 14, are withdrawn from the forward end. When the rods 28a and 28b reach the back end, the grippers 88a and 88b of the air chuck 86 are opened to release the work at a predetermined position.

Figure 10:
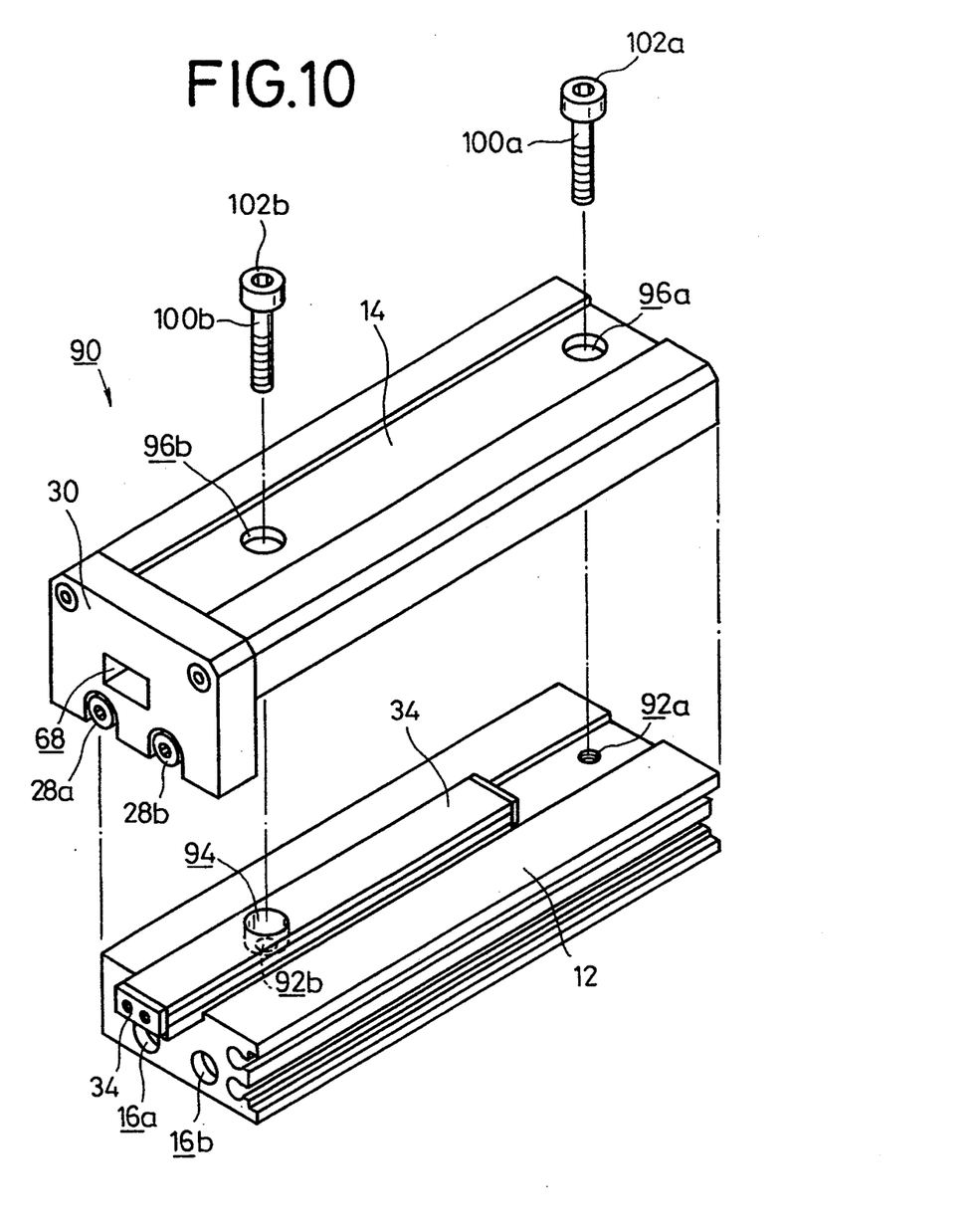
FIG. 10 is a perspective partially exploded view of a slide actuator according to a still further embodiment of the present invention.

FIG. 10 shows a slide actuator 90 according to a fourth embodiment, which is convenient for mounting to a wall or like flat surface, in association with screws 100a and 100b, having respectively screw heads 102a and 102b. The slide actuator 90 has: a cylinder body 12 having threaded holes 92a and 92b defined therethrough; a guide rail 34 mounted on cylinder body 12, which has a through hole 94 defined therethrough, whose diameter is larger than that of each of the threaded holes 92a and 92b; and a slide table 14 having through holes 96a and 96b therethrough, each having the same diameter as that of through hole 94 and a diameter larger than that of each of screw heads 102a and 102b. Holes 92a, 92b, 94, 96a, 96b are all oriented in the same direction, being orthogonal to the longitudinal axis of their respective associated components, cylinder body 12, guide rail 34 and slide table 14. Actually, other diameters of the various holes are possible, as long as the through hole(s) has a diameter larger than the associated screw head.

In the state in which unillustrated rods have been accommodated in their corresponding cylinder chambers 16a and 16b in their back positions, the through hole 96a coincides with the threaded hole 92a, and the through holes 94 and 96b coincide with the threaded hole 92b.

Mounting actuator 90 to a wall (unillustrated) is effected in the following manner. The bottom of the cylinder body 12 is brought into abutment against the surface of the wall and the slide table 14 is maintained in its back position, to effect the coincidence of holes, described above. Then, screws 100a and 100b are respectively threadedly inserted into their corresponding threaded holes 92a and 92b through the through hole 96a and the through holes 96b and 94 respectively.

Screws 100a and 100b are then further threaded so that their leading ends are inserted into the wall surface, to securely mount the slide actuator 90 to the wall and to position screw heads 102a and 102b respectively extend through the through holes 96a and 96b. The screw head 102a is forcibly positioned against the cylinder body 12. The screw head 102b is forcibly positioned against cylinder body 12, completely within the through hole 94 of the guide rail 34. That is, screw head 102b lies below the path of slide table 14. Thus, when the slide table 14 reciprocally travels on the guide rail 34, the screw heads 102a and 102b do not interfere with such travel.

The slide actuator according to the present invention brings the following advantages.

Even when a load acts on a slide table, the load is supported by cylindrical roller bearings fitted within channels defined by grooves of two guide members and a guide rail. That is, the circumferential surfaces of the rollers are brought into contact with respective planes of the first and second grooves. Thus, a sufficient area at which the rollers make contact with the guide members, is provided so that the rollers can support a large load. With this arrangement, the slide actuator can be manufactured so as to be small and light weight.

When a slide table is positioned at a predetermined place on a cylinder body, holes can be defined in the cylinder body to coincide with through holes defined in the slide table. Thus, the cylinder body can be fixed to a wall surface or the like by threadedly inserting fixing members into the fixing holes via the through holes.

Having now fully described the invention, it will be apparent to those skilled in the art that many changes and modification can be made without departing from the spirit or scope of the invention as set forth herein.

What is claimed is:

1. A slide actuator comprising:
   a cylinder body having first and second chambers and first and second ports for communication between said first and second chambers and an external pressurized fluid source;
   first and second pistons respectively reciprocally displaceable within said first and second chambers, in response to the pressurized fluid;
   first and second piston rods attached at respective first ends to said first and second pistons, and having respective second ends projecting from said cylinder body;
   a guide rail mounted centrally on top of said cylinder body;
   a slide table slidable along said cylinder body and guided by said guide rail, said slide table having one end fixed to projecting ends of said first and second piston rods, and having mounted underneath said slide table two guide members which bracket said central guide rail;
   said central guide rail having two respective 90° V-shaped grooves on opposed sides thereof, and said guide members having 90° V-shaped grooves opening in an opposed fashion to said two respective 90° V-shaped grooves, to thereby define two channels;
   a plurality of cylindrical rollers, alternately inclined by 90°, and fitted in said channels; and
   stoppers disposed in said grooves for preventing said rollers from exiting from said grooves.

2. A slide actuator according to claim 1, wherein there is the same number of said rollers in each of said channels and wherein said number is an even number.

3. A slide actuator according to claim 1, wherein said guide rail grooves have respective slots longitudinally extending along apexes thereof, into which peripheral ends of at least a portion of said rollers extend.

4. A slide actuator according to claim 3, wherein said guide member grooves have respective slots longitudinally extending along the apexes thereof, into which peripheral ends of at least a portion of said rollers extend.

5. A slide actuator according to claim 1, wherein the number of rollers is selected so that the sum of diameters of said rollers in one channel is less than the length of the shorter of said guide member groove and said guide rail groove defining said one channel.

6. A slide actuator according to claim 1, wherein said first and second ports are defined in a longitudinal side wall of said cylinder body, and said cylinder chambers are respectively blocked by stoppers at said one end of said cylinder body.

7. A slide actuator according to claim 1, which comprises a first threaded screw with a screw head, wherein said cylinder body has a first threaded hole, and said slide table has a first through hole having a diameter larger than that of said first screw head, said first threaded hole and said first through hole coinciding with a direction orthogonal a longitudinal axis of said slide actuator.

8. A slide actuator according to claim 7, which comprises a second threaded screw with a head, wherein said cylinder body has a second threaded hole and said slide table has a second through hole having a diameter larger than that of said second screw head, said second threaded hole and said second through hole coinciding in a direction orthogonal to the longitudinal axis of the said slide actuator.

9. A slide actuator according to claim 8, wherein said guide rail has a through hole, coinciding with said second through hole and said second threaded hole, and said through hole has a diameter larger than that of said second screw head.

10. A slide actuator comprising:
    a cylinder body having first and second chambers and first and second ports for communication between said first and second chambers and an external pressurized fluid source;
    first and second pistons respectively reciprocally displaceable within said first and second chambers, in response to the pressurized fluid;
    first and second piston rods attached at respective first ends to said first and second pistons, and having respective second ends projecting from said cylinder body;
    a guide rail mounted centrally on top of said cylinder body;
    a slide table slidable along said cylinder body and guided by said guide rail, said slide table having one end fixed to projecting ends of said first and second piston rods, and having mounted underneath said slide table two guide members which bracket said central guide rail, wherein said slide table has an end plate mounted to said projecting ends of said piston rods, said end plate having a hole profiled therethrough to accept one end of said guide rail therein;
    said central guide rail having two respective 90° V-shaped grooves on opposed sides thereof, and said guide members having 90° V-shaped grooves opening in an opposed fashion to said two respective 90° V-shaped grooves, to thereby define two channels; and
    a plurality of cylindrical rollers, alternately inclined by 90°, and fitted in said channels.

11. A slide actuator according to claim 10, wherein said one end of said cylinder body corresponds with one end of said guide rail.

12. A slide actuator according to claim 10, wherein there is the same number of said rollers in each of said channels and wherein said number is an even number.

13. A slide actuator according to claim 10, wherein said guide rail grooves have respective slots longitudinally extending along apexes thereof, and into which peripheral ends of at least a portion of said rollers extend.

14. A slide actuator according to claim 13, wherein said guide member grooves have respective slots longitudinally extending along the apexes thereof, and into which peripheral ends of at least a portion of said rollers extend.

15. A slide actuator according to claim 10, wherein the number of rollers is selected so that the sum of diameters of said rollers in one channel is less than the length of the shorter of said guide member groove and said guide rail groove defining said one channel.

16. A slide actuator according to claim 10, wherein said first and second ports are defined in a longitudinal side wall of said cylinder body, and said cylinder chambers are respectively blocked by stoppers at said one end of said cylinder body.

17. A slide actuator according to claim 10, which comprises a first threaded screw with a screw head, wherein said cylinder body has a first threaded hole, said slide table has a first through hole having a diameter larger than that of said first screw head, said first threaded hole and said first through hole coinciding in a direction orthogonal to a longitudinal axis of said slide actuator.

18. A slide actuator according to claim 17, which comprises a second threaded screw with a head, wherein said cylinder body has a second threaded hole and said slide table has a second through hole having a diameter larger than that of said second screw head, said second threaded hole and said second through hole coinciding in a direction orthogonal to the longitudinal axis of the said slide actuator.

19. A slide actuator according to claim 18, wherein said guide rail has a through hole, coinciding with said second through hole and said second threaded hole, said through hole having a diameter larger than that of said second screw head.

20. A slide actuator comprising:
a cylinder body having first and second chambers and first and second ports for communication between said first and second chambers and an external pressurized fluid source;
first and second pistons reciprocally displaceable respectively within said first and second chambers, in response to the pressurized fluid;
first and second piston rods attached at respective first ends to said first and second pistons, and having respective second ends projecting from said cylinder body;
a guide rail mounted centrally on top of said cylinder body;
a slide table slidable along said cylinder body and guided by said guide rail, said slide table having one end fixed to projecting ends of said first and second piston rods, and having mounted underneath said slide table two guide members which bracket said central guide rail;
said central guide rail having two respective 90° V-shaped grooves on opposed sides thereof, and said guide members having 90° V-shaped grooves opening in an opposed fashion to said two respective 90° V-shaped grooves, to thereby define two channels;
a plurality of cylindrical rollers, alternately inclined by 90°, and fitted in said channels; and
a stroke control mechanism for controlling the range of longitudinal movement of said slide table relative to said cylinder body, wherein said stroke control mechanism comprises a stopper block attached to said cylinder body and a shuttle block attached to said slide table and aligned so that the displacement of said slide table is stopped by said stopper block.

21. A slide actuator according to claim 20, wherein said stopper block is provided with a adjusting mechanism for adjustably controlling the range of longitudinal movement of said slide table.

22. A slide actuator according to claim 20, wherein said shuttle block is provided with an adjusting mechanism for adjustably controlling the range of longitudinal movement of said slide table.

23. A slide actuator according to claim 22, wherein said adjusting mechanism comprises a screw with a head, said screw being threadedly inserted in said stopper block, and wherein said shuttle block is brought into abutment against said screw head.

24. A slide actuator according to claim 22, wherein said adjusting mechanism comprises a screw with a head, said screw being threadedly inserted in said shuttle block, and wherein said stopper block is brought into abutment against said screw head.

25. A slide actuator according to claim 20, wherein there is the same number of said rollers in each of said channels and wherein said number is an even number.

26. A slide actuator according to claim 20, wherein said guide rail grooves have respective slots longitudinally extending along apexes thereof, and into which peripheral ends of at least a portion of said rollers extend.

27. A slide actuator according to claim 26, wherein said guide member grooves have respective slots longitudinally extending along the apexes thereof, and into which peripheral ends of at least a portion of said rollers extend.

28. A slide actuator according to claim 20, wherein the number of said rollers is selected so that the sum of diameters of said rollers in one channel is less than the length of the shorter of said guide member groove and said guide rail groove defining said one channel.

29. A slide actuator according to claim 20, wherein said first and second ports are defined in a longitudinal side wall of said cylinder body, and said cylinder chambers are respectively blocked by stoppers at said one end of said cylinder body.

30. A slide actuator according to claim 20, which comprises a first threaded screw with a screw head, wherein said cylinder body has a first threaded hole, and said slide table has a first through hole having a diameter larger than that of said first screw head, said first threaded hole and said first through hole coinciding in a direction orthogonal to a longitudinal axis of said slide actuator.

31. A slide actuator according to claim 30, which comprises a second threaded screw with a head, wherein said cylinder body has a second threaded hole and said slide table has a second through hole having a diameter larger than that of said second screw head, said second threaded hole and said second through hole coinciding in a direction orthogonal to the longitudinal axis of the said slide actuator.

32. A slide actuator according to claim 31, wherein said guide rail has a through hole, coinciding with said second through hole and said second threaded hole, and having a diameter larger than that of said second screw head.

* * * * *